(12) United States Patent
Birsching et al.

(10) Patent No.: US 7,364,006 B2
(45) Date of Patent: Apr. 29, 2008

(54) STEERING SYSTEM WITH LEADS AND PULLS COMPENSATION

(75) Inventors: Joel E. Birsching, Vassar, MI (US); Henry Yang, Fenton, MI (US); Martin P. Sheridan, Midland, MI (US); Stephen J. Reider, Frankenmuth, MI (US); Jeffrey M. Powell, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 330 days.

(21) Appl. No.: 11/122,337

(22) Filed: May 5, 2005

(65) Prior Publication Data

US 2006/0249326 A1 Nov. 9, 2006

(51) Int. Cl.
*B62D 5/06* (2006.01)
(52) U.S. Cl. .............. 180/441; 180/421; 180/422; 91/375 A
(58) Field of Classification Search ........... 180/441, 180/421, 422; 91/375 A
See application file for complete search history.

(56) References Cited

U.S. PATENT DOCUMENTS

| | | | | |
|---|---|---|---|---|
| 3,022,772 A | 2/1962 | Zeigler et al. | ............... | 121/41 |
| 4,454,801 A * | 6/1984 | Spann | ............... | 91/375 A |
| 5,070,956 A | 12/1991 | Pawlak et al. | | |
| 5,119,898 A | 6/1992 | Eckhardt et al. | ............ | 180/142 |
| 5,392,875 A * | 2/1995 | Duffy | ............ | 180/441 |
| 5,435,698 A | 7/1995 | Phillips | | |
| 5,492,191 A * | 2/1996 | Birsching | ............ | 180/446 |
| 5,655,621 A * | 8/1997 | Birsching | ............ | 180/428 |
| 5,749,432 A * | 5/1998 | Birsching | ............ | 180/443 |
| 6,390,228 B2 * | 5/2002 | Serizawa et al. | ......... | 180/403 |
| 6,966,398 B2 * | 11/2005 | Williams et al. | ........... | 180/421 |

FOREIGN PATENT DOCUMENTS

| EP | 0 375 136 | 6/1990 |
|---|---|---|
| JP | 11 078928 | 3/1999 |

* cited by examiner

*Primary Examiner*—Paul N. Dickson
*Assistant Examiner*—Marlon Arce-Diaz
(74) *Attorney, Agent, or Firm*—Michael D. Smith (57) ABSTRACT

A power assist steering system including a valve housing and a proportional control valve supported within the valve housing, further includes a pressure transducer arranged with respect to the proportional control valve for determining an amount of actuation of the proportional control valve. A pressure signal is sent from the pressure transducer to a control for determining an amount of current to be sent to an electromagnetic apparatus within the power assist steering system for overcoming a pull force.

20 Claims, 7 Drawing Sheets

STEERING SYSTEM WITH LEADS AND PULLS COMPENSATION

FIELD OF THE INVENTION

This invention relates generally to vehicle steering devices, and more particularly, this invention relates to vehicle steering devices having variable effort steering.

BACKGROUND

In a motor vehicle, a pull condition can occur in which a driver of the vehicle has to input torque into the steering system in order to maintain a straight path. This condition can be caused by vehicle and road conditions and weather conditions such as a crosswind that require a force for the steering system to overcome, or by an imbalance in the steering system (such as if the valve is balanced in the null position and the torsion bar is on center but the valve spool is creating pressure in the system) which requires an input torque by the driver to correct.

U.S. Pat. No. 5,749,432 describes a variable effort steering system that has the ability to provide torque at the input shaft with no driver input. This patent shows an angle sensor at the top and bottom of the valve assembly that are used to provide a signal indicating a rotational angular position of the spool shaft and magnet ring in order to control the amount of current provided to the actuator to provide variable effort steering. This system, however, is lacking in diagnostic capabilities, particularly with respect to vehicle pull conditions, because it does not monitor steering output.

BRIEF SUMMARY

In one exemplary embodiment, a power assist steering system including a valve housing and a proportional control valve supported within the valve housing, the power assist steering system further including a pressure transducer arranged with respect to the proportional control valve for determining an amount of actuation of the proportional control valve.

In another exemplary embodiment, a method of determining an amount of current to supply to an electromagnetic apparatus in a power assist steering system for providing leads and pulls compensation to a vehicle, the power assist steering system further including a valve housing and a proportional control valve supported within the valve housing, the method includes measuring pressure within the proportional control valve, sending a signal regarding the pressure to a control within the power assist steering system, and utilizing the signal regarding the pressure within the control for determining the amount of current to supply to the electromagnetic apparatus.

In another exemplary embodiment, a power assist steering system includes an actuator and a controller, wherein the controller determines an amount of current to be provided to the actuator for overcoming a pull force experienced by the power assist steering system.

Other systems and methods according to embodiments will become apparent to one with skill in the art upon review of the following drawings and detailed description.

BRIEF DESCRIPTION OF THE DRAWINGS

The present invention will now be described, by way of example, with reference to the accompanying drawings, in which:

FIG. 11 is a flow chart illustrating the operation of the control of FIG. 9; and, FIG. 12 is a sectional view of another embodiment of a motor vehicle power steering gear taken along a longitudinal centerplane thereof.

DETAILED DESCRIPTION

Figure 1:
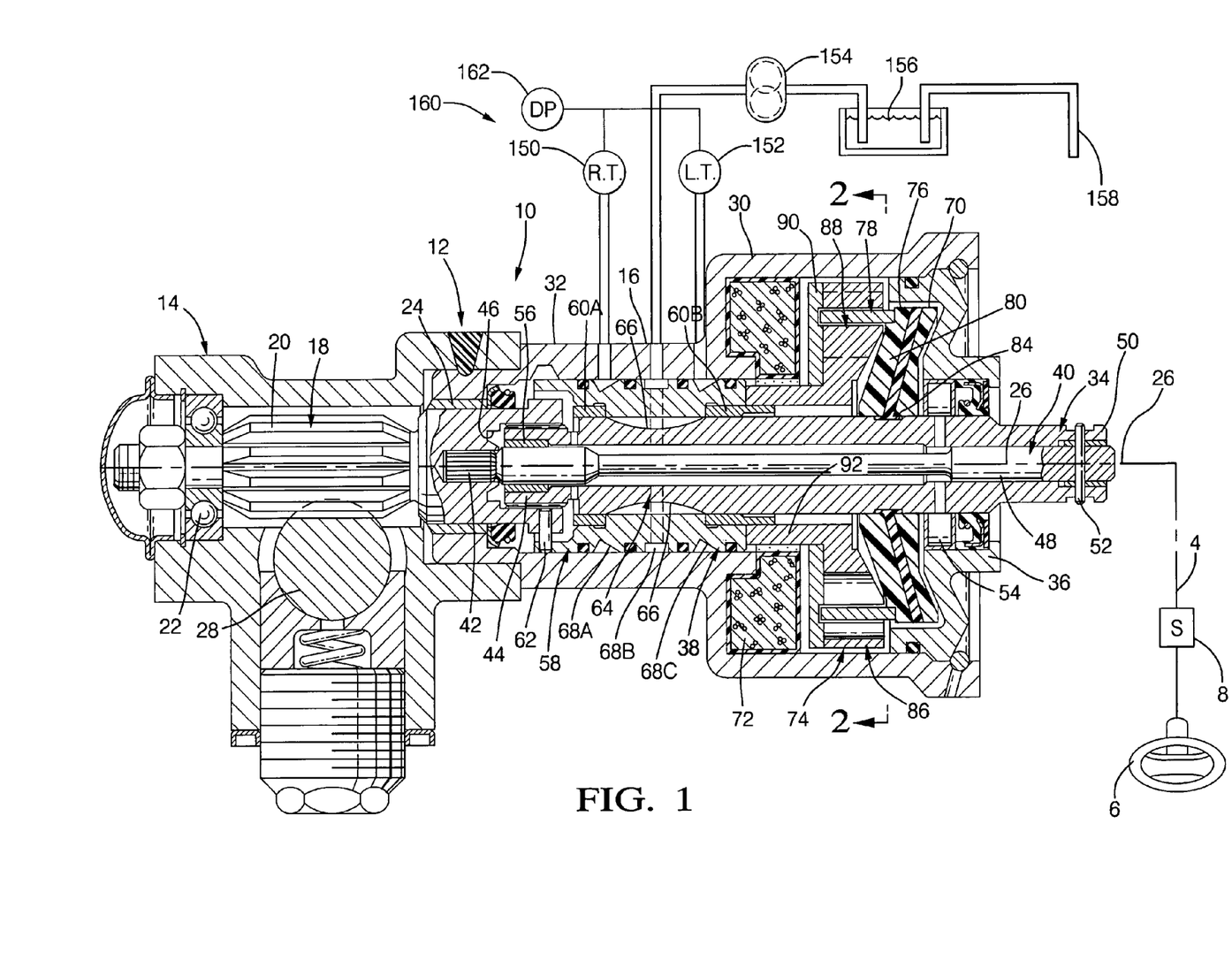
FIG. 1 is a sectional view of a motor vehicle power steering gear taken along a longitudinal centerplane thereof.

Referring to FIG. 1, a motor vehicle power steering gear 10 as partially described in U.S. Pat. No. 5,119,898, herein incorporated by reference in its entirety, includes a composite housing 12 having a rack housing 14 and a valve housing 16. Driver input is provided via hand wheel 6 attached to the power steering gear 10 via a steering shaft 4. It should be understood that the steering shaft 4 may include first and second shafts, or other alternate configurations for connecting a hand wheel (otherwise known as a steering wheel) 6 to the power steering gear 10. A position sensor 8 may be provided relative to the hand wheel 6 for detecting position of the hand wheel 6, thus providing an indication of driver input. A position signal is sent to a controller for processing as will be further described below. Steering wheel velocity can be determined within the controller using the position signal. A pinion head 18 having a plurality of gear teeth 20 thereon is supported on the rack housing 14 by a ball bearing 22 and by a sleeve bearing 24 for rotation about a centreline 26 of the composite housing 12. A rack bar 28, having a plurality of rack teeth meshing with the gear teeth 20 on the pinion head, is supported on the rack housing 14 for bodily movement perpendicular to the centreline 26 in response to rotation of the pinion head. The ends of the rack bar, not shown, are connected to steerable wheels of the motor vehicle in conventional fashion.

Valve housing 16 has a large diameter part 30 and a small diameter part 32. A tubular stub or spool shaft 34 of the steering gear protrudes into valve housing 16 through a cover 36 at an open end of large diameter part 30. A proportional control valve 38 of steering gear 10, like the proportional control valves described in the aforesaid U.S. Pat. Nos. 4,454,801 and 3,022,772, is disposed inside small diameter part 32 of the valve housing and includes a torsion bar 40 inside spool shaft 34. Torsion bar 40 has a serrated inboard end 42 protruding beyond a corresponding inboard end 44 of spool shaft 34 and force fitted in a bore inside a counterbore 46 in pinion head 18. Torsion bar 40 has an outboard end 48 rigidly connected to spool shaft 34 at an outboard end 50 of the latter by a pin 52.

The outboard end 50 of spool shaft 34 is connected to manual steering wheel 6 of the motor vehicle for rotation as a unit therewith. Spool shaft 34 is supported on composite housing 12 for rotation about centreline 26 independent of pinion head 18 by a roller bearing 54 on cover 36 and by a sleeve bearing 56 between the torsion bar and the spool shaft. A lost motion connection in counterbore 46 permits about 14 degrees of relative angular movement between the pinion head and the spool shaft.

A tubular valve body 58 of proportional control valve 38 is supported on spool shaft 34 for rotation about centreline 26 independent of the spool shaft by a pair of bushing rings 60A-B press fitted in counterbores in the ends of the valve body. Valve body 58 is connected by a pin 62 to pinion head 18 for rotation as a unit therewith. A valve spool 64 of proportional control valve 38 is defined on spool shaft 34 inside valve body 58 and includes a plurality of arc-shaped slots 66 facing a plurality of internal grooves, not shown, in the valve body and cooperating therewith in defining a plurality of variable area throttling orifices. A plurality of outside annular grooves 68A-C on the valve body 58 are isolated from one another by seal rings slidably engaging the wall of the small diameter part 32 of the valve housing. Grooves 68A, 68C, right turn and left turn chambers, respectively, are connected to opposite working chambers of a steering assist fluid motor. Groove 68A may be connected to a right chamber (RT) 150 and groove 68C may be connected to a left chamber (LT) 152 of the power cylinder (actuator) as indicated for generating a corresponding level of steering assist force in rack 28 as described above. Groove 68B, a supply chamber, may be connected to a hydraulic pump 154. The hydraulic pump 154 may supply fluid to the supply chamber, groove 68B, and such fluid may be directed to the right turn and left turn chambers, grooves 68A and 68C respectively, via the slots 66 of the valve spool 64 and passages, such as drilled passages (not shown) connecting the slots 66 to the grooves 68A and 68C. The fluid is directed to the right turn and left turn chambers, grooves 68A and 68C, depending on the direction and degree of relative rotation between the spool 64 and the valve body 58. An exhaust passage (not shown) within the valve may return hydraulic fluid to the fluid reservoir 156 of the pump 154 via line 158. Similar hydraulic connections are further described in detail in U.S. Pat. Nos. 5,119,898 and 4,454,801, the disclosures of which are incorporated herein by reference in their entirety.

Torsion bar 40, when it has no twist between its outboard end 48 and inboard end 42 and thus exerts no torque therebetween, defines a center position of valve spool 64 relative to valve body 58 in which all the throttling orifices are equally open and fluid circulates freely from groove 68B to a drain, not shown, connected to a reservoir. When valve spool 64 is rotated relative to valve body 58 by manual effort applied at the steering wheel, one half of the throttling orifices become smaller and regulate a steering assist boost pressure in a corresponding one of the grooves 68A, 68C and one half of the throttling orifices become larger for unobstructed drainage of fluid from the other of the grooves 68A, 68C to the reservoir. The flow area of the smaller throttling orifices is proportional to the amount of twist between outboard end 48 of the torsion bar and inboard end 42 thereof. The centering torque of torsion bar 40 resisting such twist is the manual effort necessary to steer the vehicle perceived by the operator through the steering wheel.

The steering gear 10 described herein incorporates a differential pressure transducer system 160 shown generally in FIG. 1. A pressure transducer converts pressure into an electrical signal. One type of pressure transducer is a strain-gage based transducer, where the conversion of pressure into an electrical signal is achieved by the physical deformation of a strain gage or gages bonded into the diaphragm of the pressure transducer. The diaphragm may help protect the sensor element, such as the strain gage, from the fluid that is being measured. A strain gage is a resistive element whose resistance changes with the amount of strain placed on it. Pressure applied to the transducer may produce a deflection of the diaphragm that introduces strain to the gages, which produces an electrical resistance change proportional to the pressure. While some pressure transducers compare a measuring port to a reference port, a differential pressure transducer is arranged such that there is a comparison between the measuring port (a first measuring port) and a second measuring port. By nature, pressure is the difference between two points or ports. Pressure between two ports (or pipe connections) is differential pressure, which may be measured in units of "PSID" which means "Pounds per Square Inch Differential". The output of the transducer is a voltage, which may be converted to a current so that a signal is sent as a current. By sending the signal as a current, there is no error from voltage drop introduced from the resistance of the wire, whatever the length is. Some applications may convert the voltage to a 4-20 mA (milli Amperes) current loop, such that a pressure reading of zero would cause the transducer to transmit 4 mA, and a full scale output ("FSO") of pressure, such as 100 PSI, would cause the transducer to transmit 20 mA.

In the illustrated embodiment of FIG. 1, the differential pressure transducer system 160 includes a differential pressure transducer 162 where the first measuring port may be one of the groove 68A and groove 68C, and the second measuring port may be the other of the groove 68A and groove 68C. Although the differential pressure transducer 162 is illustrated as distanced from the groove 68A and groove 68C for clarity, it should be understood that pressure readings may be taken directly from the grooves 68A, 68C. Alternatively, the differential pressure transducer 162 may compare pressure in the chambers 150, 152, however by comparing pressure within the grooves 68A and 68C, the effects of the cylinder line dynamics are minimized in the determination of valve angle.

By measuring the assist pressure, as shown in FIG. 1, the valve angle can be determined, since the amount of valve actuation is used to control the amount of hydraulic assist. The valve angle can then be used to control the amount of current supplied to the actuator in order to provide the amount of variable effort required, as will be further described with respect to FIGS. 9-11. In addition, the differential pressure measurement also provides information as to how much assist is being provided, and thus provides this system with a diagnostic capability not previously available. By monitoring assist pressure relative to steering wheel position (e.g., as provided by steering wheel position sensor 8), the amount of pull force can be determined. The pull force can then be reduced or eliminated by providing the appropriate amount of current to the actuator, so that it provides the necessary torque to keep the vehicle going straight and not the driver.

An electromagnetic apparatus 70 of steering gear 10 varies the effective centering torque of the torsion bar to change the level of steering assist, i.e. steering assist boost pressure, achieved for a given manual steering input applied at the steering wheel of the motor vehicle. Thus, the electromagnetic apparatus functions as an actuator. Electromagnetic apparatus 70 includes a stationary exciting coil 72 at the inboard end of large diameter part 30 of valve housing 16, a pole piece 74, and a permanent magnet assembly 76.

Figure 2:
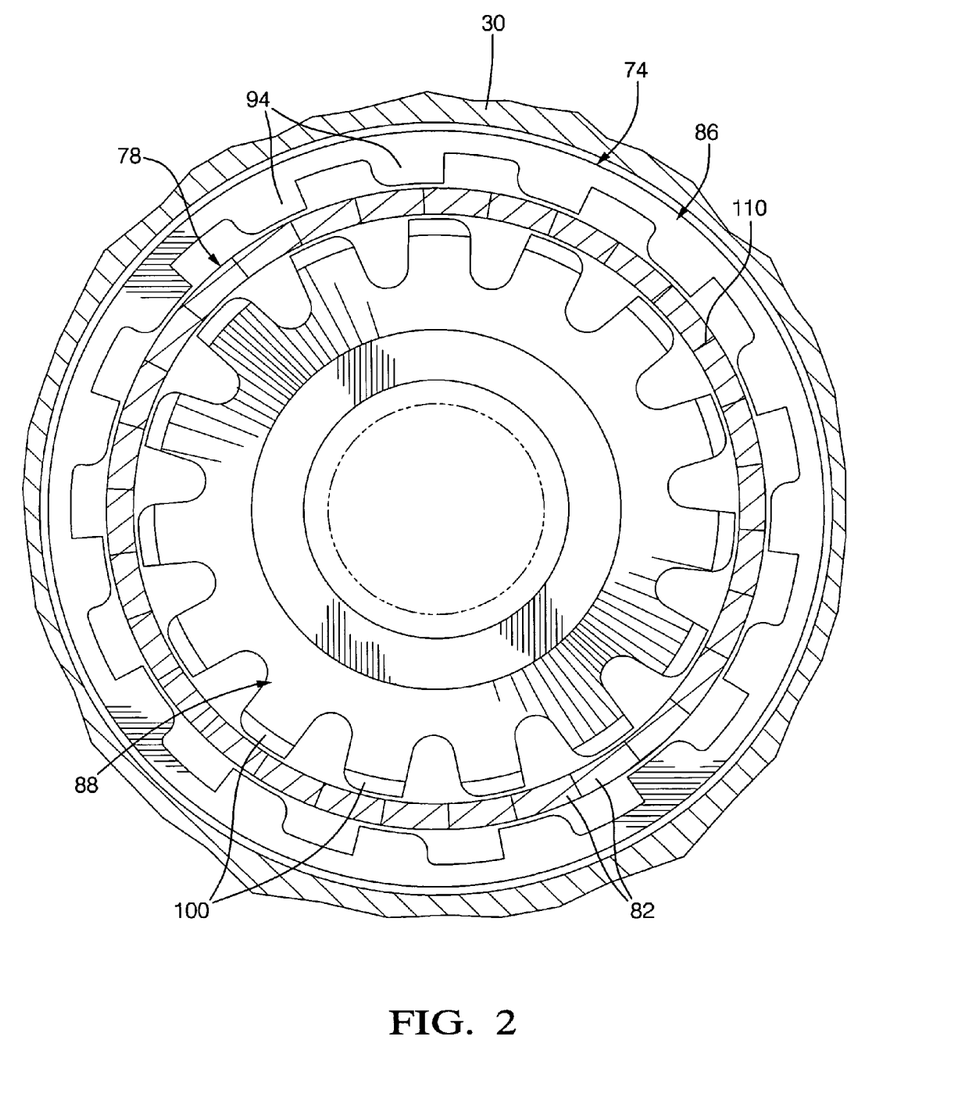
FIG. 2 is a sectional view taken generally along the plane indicated by lines 2-2 in FIG. 1.

As seen in FIGS. 1 and 2, permanent magnet assembly 76 includes a cylindrical permanent magnet ring 78 and a retaining hub 80 on spool shaft 34. Ring 78 may be made of sintered powdered metal magnetized to define an even number "n" of radially oriented permanent magnets 82, the polarity of which alternate around the ring. An axial end of permanent magnet ring 78 is rigidly attached to retaining hub 80, whereby the magnet ring is supported on spool shaft 34 symmetrically around centreline 26. Hub 80 and permanent magnet ring 78 are connected to spool shaft 34 for rotation as a unit with the spool shaft and valve spool 64 around centreline 26 by a plastic ring 84 which is injection molded in situ through a bore in the web of the retaining hub.

Referring to FIG. 2, pole piece 74 includes a cylindrical, magnetic flux conducing outer ring 86 radially outside or outboard permanent magnet ring 78 and a cylindrical, magnetic flux conducting inner ring 88 radially inside or inboard the magnet ring. As seen in FIG. 1, inner and outer rings 88 and 86 are rigidly interconnected by an annular, non-ferromagnetic flat plate 90 in a radial plane perpendicular to centreline 26. Inner ring 88 has a tubular skirt 92 inside exciting coil 72 which is press fitted on an extension of the bushing ring 60B whereby pole piece 74 is rotatable as a unit with valve body 58 and pinion head 18 around centreline 26 relative to spool shaft 34 and valve spool 64.

Figure 3:
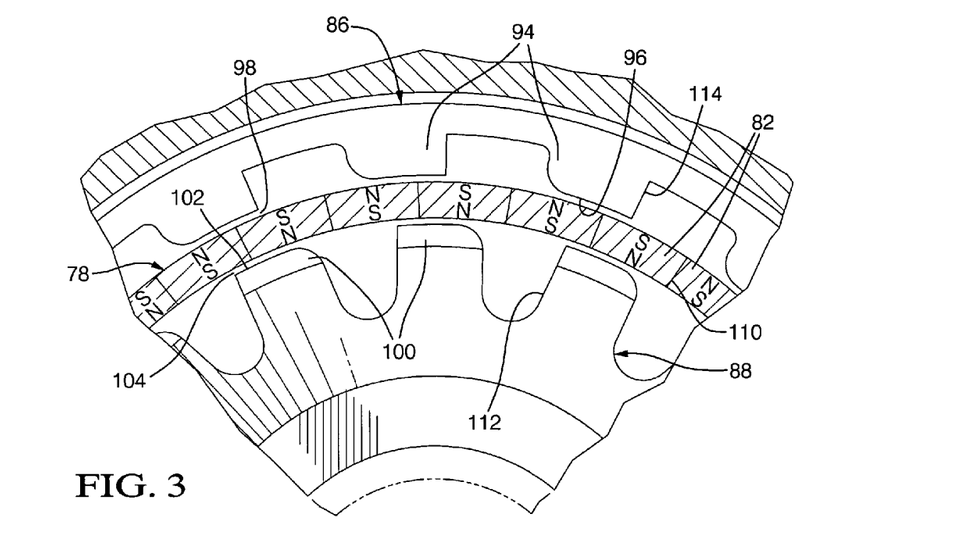
FIG. 3 is an enlarged view of a portion of FIG. 2.

Referring again to FIG. 2, outer ring 86 has n/2 integral outer pole teeth 94 extending radially inward toward magnet ring 78. As seen best in the enlarged view of FIG. 3, each outer pole tooth 94 has an inboard end 96 facing permanent magnet ring 78 and separated therefrom by an outer air gap 98 having a predetermined radial dimension. Similarly, inner ring 88 has n/2 integral inner pole teeth 100 extending radially outward toward magnet ring 78. Each inner pole tooth 100 has an outboard end 102 facing permanent magnet ring 78 and separated therefrom by an inner air gap 104 having a predetermined radial dimension. The radial dimensions of the inner and outer air gaps 104, 98 are exaggerated in FIGS. 3-4 for clarity. As seen in FIGS. 2 and 3, there are identical numbers of inboard teeth 94 of outer ring 86 and outboard teeth 100 of inner ring 88. Each of the latter is opposingly matched with one of the former to form a radially arranged pair of pole teeth, one from each of the inner and outer rings. Teeth 100 of inner ring 88 in this embodiment are angularly offset to the right with respect to corresponding teeth 94 of outer ring 86; but each pair of teeth defines a region of circumferential overlap therebetween, corresponding to the angle, in FIG. 3, between a counterclockwise radial edge 112 of a tooth 100 and a clockwise radial edge 114 of a tooth 94. A center of each pole tooth pair is defined midway between the centers of the inner and outer pole teeth of the pair. If the inner and outer teeth were not offset, the region of circumferential overlap would be the entire tooth width with the center of the pair corresponding with the centers of the individual teeth.

Permanent magnets 82 are separated from each other by boundaries 110 and are evenly arrayed around the circumference of permanent magnet ring 78 so that the angular interval between boundaries 110, and thus the effective circumferential extent of each magnet 82, is 360/n degrees. In the embodiment shown, for example, magnet ring 78 includes 30 magnets 82, each subtending an angle of 12 degrees. With no electric current in exciting coil 72, magnetic interaction between permanent magnets 82 and pole teeth 94, 100 due solely to the permanent magnets defines a plurality of neutral or null positions of pole piece 74 relative to permanent magnet assembly 76, as seen in curve 200 of FIG. 5, in which electromagnetic torque between permanent magnet ring 78 and pole piece 74 is plotted as a function of arbitrary rotational position with no current in exciting coil 72. In the null positions, net force reactions between the magnet ring and the pole teeth are in static equilibrium, so that the net torque reaction between permanent magnet assembly 76 and pole piece 74 due to permanent magnets 82 is zero.

Outer pole teeth 94 are magnetically coupled to exciting coil 72 by the wall of large diameter part 30 of valve housing 16. Inner pole teeth 100 are magnetically coupled to the exciting coil by tubular skirt 92 and valve body 58. When electric current flows in the exciting coil, inner pole teeth 100 assume opposite polarity from outer pole teeth 94 depending upon the direction of current flow. Electromagnetic flux concentrated by the inner and outer pole teeth traverses the inner and outer air gaps 104, 98 and interacts with the permanent magnetic flux of permanent magnets 82 to either attract or repel the permanent magnets.

For optimum steering gear performance, a null position of pole piece 74 relative to permanent magnet assembly 76 must coincide with the aforesaid center position of valve spool 64 relative to valve body 58. To achieve such coincidence, proportional control valve 38 is first assembled in composite housing 12 with the center position of valve spool 64 relative to valve body 58 captured by drilling holes for and inserting pin 52 in the torsion bar and the spool shaft after the proportional control valve is hydraulically balanced. Permanent magnet assembly 76 is then rotated on the spool shaft to the aforesaid null position. Finally, ring 84 is in situ injection molded between retaining hub 80 and spool shaft 34 to capture the position of the permanent magnet assembly relative to the pole piece. Since the null position of electromagnetic apparatus 70 is made to correspond with the center position of valve spool 64 in proportional valve 38, the two terms will be used interchangeably in this specification.

Figure 4:
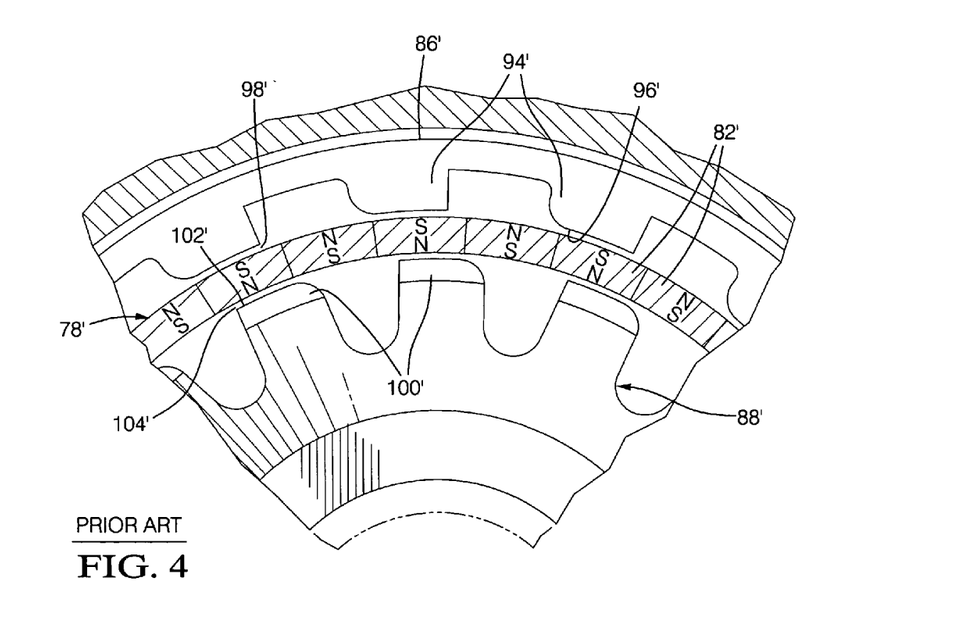
FIG. 4 is an enlarged view of a portion of a motor vehicle power steering gear of the prior art.
Figure 5:
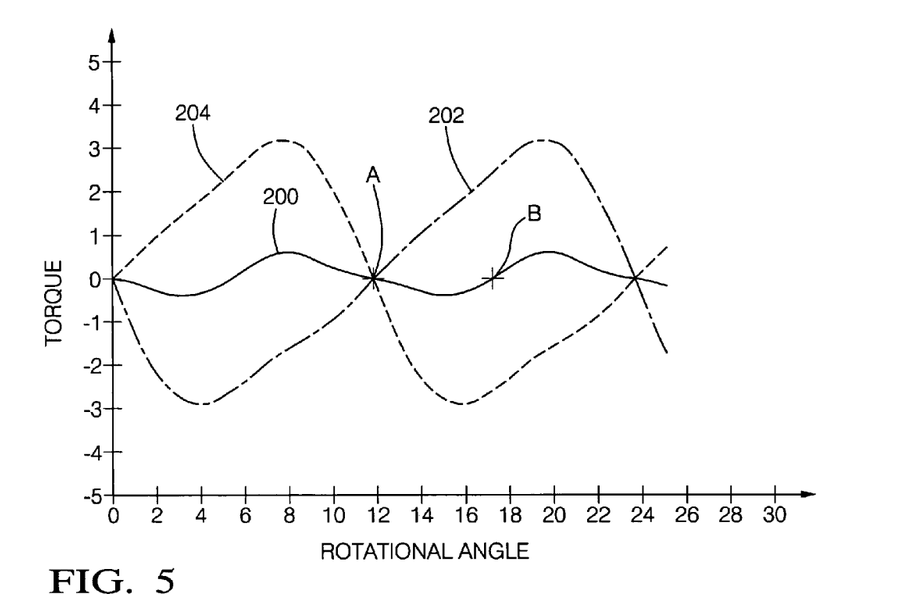
FIG. 5 is a set of curves showing typical magnetic actuator torque as a function of rotational angle for vehicle power steering gear apparatus of the type including some of the prior art devices recited above and also the power steering gear disclosed herein.
Figure 6:
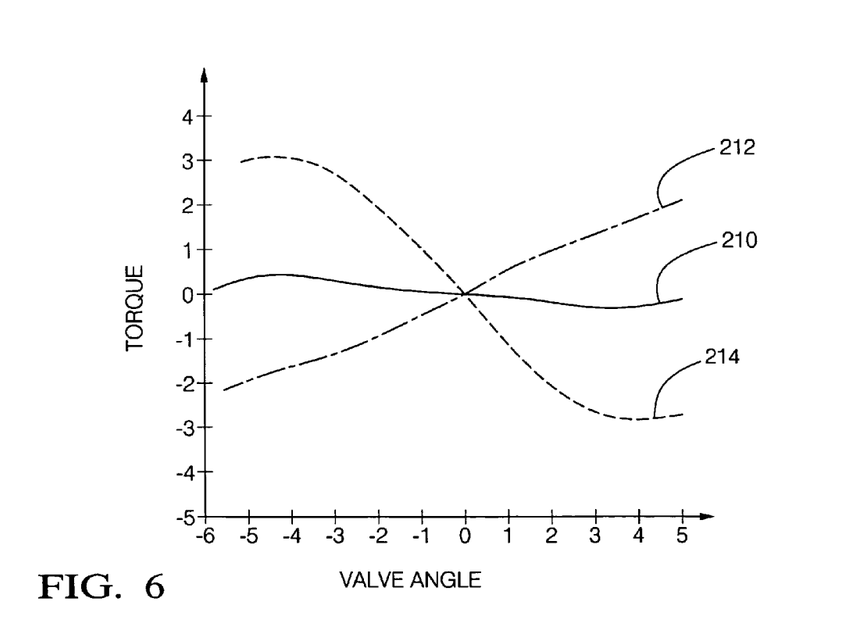
FIG. 6 is a set of curves showing available electromagnetic torque for power steering gear of the prior art.

The orientation of permanent magnet ring 78 with respect to pole piece 74 in the center position of valve spool 64 in proportional control valve 38 is advantageously arranged as will be described with respect to FIG. 3. The null positions of the apparatus may be divided into two groups, the null positions in each group being electromagnetically indistinguishable from the others in the same group. Power steering gears of the prior art, as seen in FIG. 4, use a position corresponding to point A of curve 200 in FIG. 5, a null position in which the centers of alternate ones of permanent magnets 82' are aligned with the centers of the regions of circumferential overlap of the pole tooth pairs in pole piece 74. The torque produced with such an orientation when current is applied to exciting coil 72 is shown by curves 202 and 204 of FIG. 5, which show the variation of torque with valve rotation for oppositely directed three amp currents. The portion of these curves around point A of FIG. 5 are redrawn in FIG. 6 as curves 212 and 214, with zero angle corresponding to point A in FIG. 5 and curve 210 corresponding to no current through the coil. Although the addition of current in exciting coil 72 in the center or null position increases the various opposing torques between permanent magnet member 78' and pole piece 74, these torques remain in balance and the net torque in the center position remains zero, regardless of current level. When permanent magnet ring 78' is rotated from the center position, current in one direction produces opposite magnetic poles in the inner and outer teeth of each pair, which poles thus attract the closest poles of magnets 82'. This produces a restoring electromagnetic torque which effectively adds to the restoring toque of torsion bar 40 and therefore increases the net restoring torque and apparent steering effort, as seen in curve 212 of FIG. 6. Current in the opposite direction produces the opposite magnetic poles in the teeth, which thus repel the closest poles of magnets 82'. This produces a rotation aiding torque, which opposes the restoring torque of torsion bar 40 and therefore decreases the net restoring torque and apparent steering effort, as seen in curve 214 of FIG. 6. However, since torque increases linearly from zero at the center position, the available electromagnetic torque near the center position at point A is small at any reasonable current level. The situation is not much affected by the mechanical torque of torsion bar 40, which also varies linearly from zero at zero angle. The shortage of available electromagnetic torque near the center position works directly against any attempt to establish a steering torque in such apparatus electromagnetically.

Magnet ring 78 is oriented in the center position in a position of zero electromagnetic torque with no current in exciting coil 72 corresponding with point B of curve 200 in FIG. 5. Point B corresponds to a six degree offset from point A, which offset is essentially one half magnet pitch or one quarter tooth pitch. In this orientation, as seen in FIG. 3, alternate ones of boundaries 110 which separate the magnets aligned substantially with the centers of the regions of circumferential overlap of successive tooth pairs. Thus, a first boundary 110 is aligned with the center of one tooth pair; a second successive boundary 110 is aligned between that tooth pair and the next; a third successive boundary 110 is aligned with the center of the next successive tooth pair, in a continuing pattern around permanent magnet ring 78.

Figure 7:
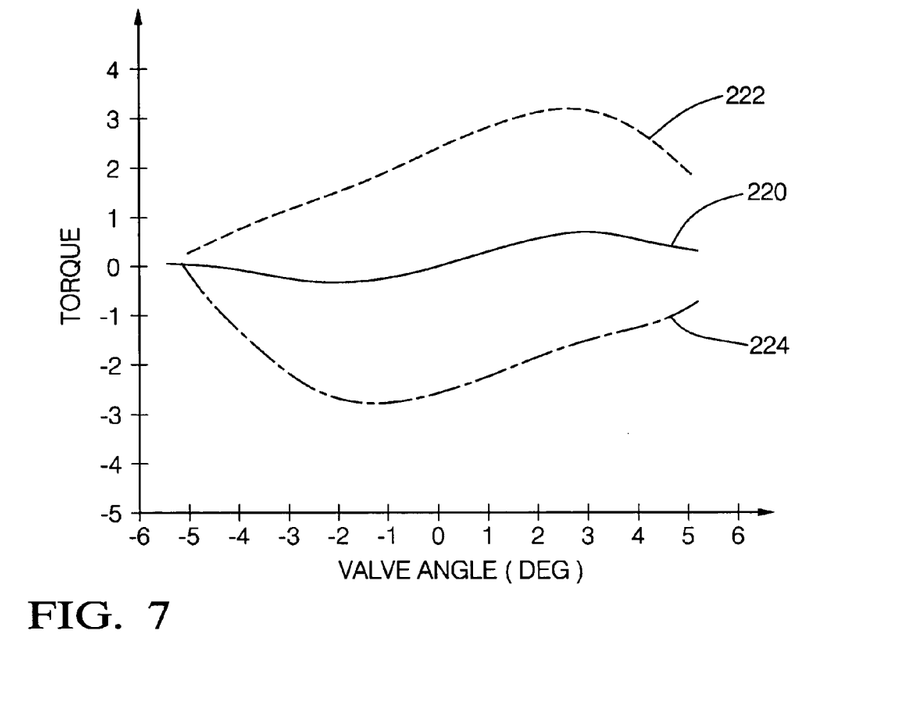
FIG. 7 is a set of curves showing available electromagnetic torque for the power steering gear of this invention.

In this orientation of permanent magnet ring 78 with respect to pole piece 74, when current is increased from zero with the apparatus in the center position, magnetic poles are created in the teeth which act on both poles of magnets 82 to rotate magnet ring clockwise with current in one direction and counter-clockwise with current in the opposite direction. As seen in curves 202 and 204 of FIG. 5, there is substantial electromagnetic torque available at very small angular displacements from the center position at point B as well as larger angular displacements. The portion of these curves around point B of FIG. 5 are redrawn in FIG. 7 as curves 222 and 224, with zero angle corresponding to point B in FIG. 5. Substantial electromagnetic torque is available at small displacements from the center position, as shown in FIG. 7, wherein curve 220 represents electromagnetic torque with no current, curve 222 represents electromagnetic torque with a current of position 3 amps and curve 224 represents a current of negative 3 amps.

Figure 8:
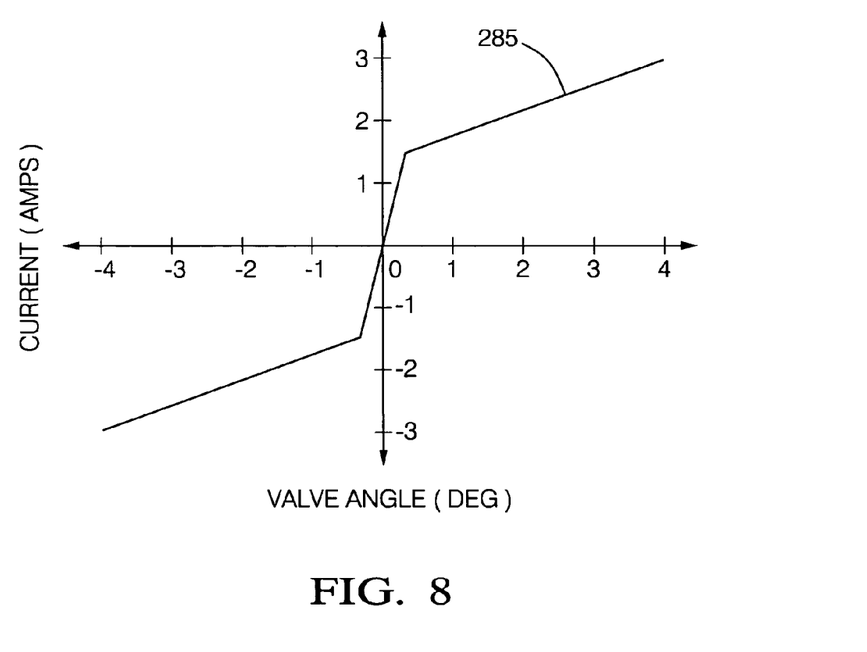
FIG. 8 is a set of curves showing typical programmed current as a function of valve angle for the power steering gear disclosed herein in order to achieve a variety of steering characteristics, including preload.

A typical preload angle/current function is shown in curve 285 of FIG. 8. This curve has a very steep slope for a small range of valve angle around the center position so as to provide a quick increase in restoring torque just off center for a "crisp" steering "feel." At a predetermined valve angle (about ⅓ degree), in each rotational direction, the slope decreases significantly to prevent steering effort from rising too much at greater valve angles, such as those encountered in highway exit ramps. Of course, the preload angle/current function shown may be modified to provide other angle/current programs, if desired. Alternately, the differential pressure measured by the differential pressure transducer 162 between the first measuring port, groove 68A, and second measuring port, groove 68C, can be utilized to determine the current function via a pressure/current function. It should further be understood that the angle in an angle/current function can be deduced from the pressure measurement.

Although substantial electromagnetic, and thus net, torque is available to provide a steering preload in the apparatus of FIGS. 1-3, the preload does not occur merely from the structure but must be achieved by programming electric current through exciting coil 72. The system in U.S. Pat. No. 5,749,432 describes programming electric current through exciting coil 72 as a function of valve angle, which is the angular displacement of the apparatus from the center position. The range over which the current is described as programmed extends about 4.5 degrees on either side of the center position. For this to be accomplished, a valve angle sensing apparatus has been used. In that embodiment, valve angle sensing apparatus is provided in the form of a pair of angle sensors, a first angle sensor providing a signal indicating a rotational angular position of pinion head 18, which rotates as one with valve body 58 and pole piece 74, and a second angle sensor providing a signal indicating a rotational angular position of spool shaft 34 and magnet ring 78. When the first and second sensors are calibrated for zero difference in the center position, the difference (magnitude and sign) in the signals from these sensors provides a valve angle signal. It should be noted that while the valve angle sensing apparatus provides a signal for controlling current through the exciting coil to provide a steering preload, it cannot, on its own, compensate for leads and pulls experienced by a vehicle. As described herein, however, the differential pressure between grooves 68A and 68C (or chambers 150 and 152) is measured. Since such a measurement is indicative of steering output, it usable for determining the appropriate current response for compensating for leads and pull conditions as will be described below.

Figure 9:
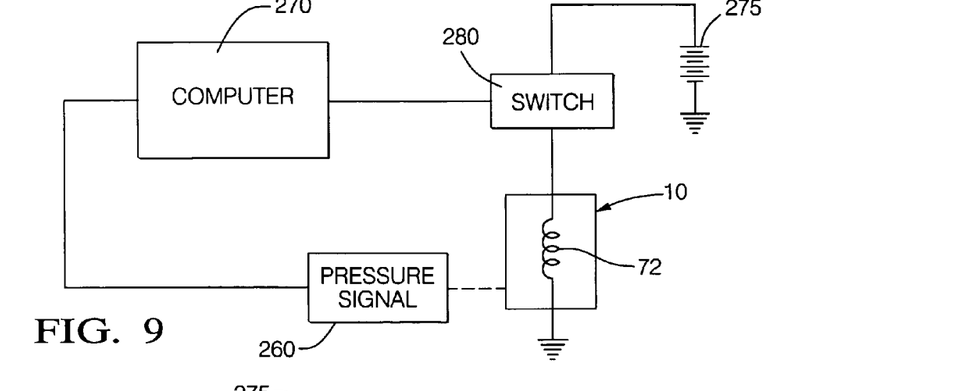
FIG. 9 is a block diagram of a differential assist pressure responsive current control for the power steering gear of FIGS. 1-3.
Figure 10:
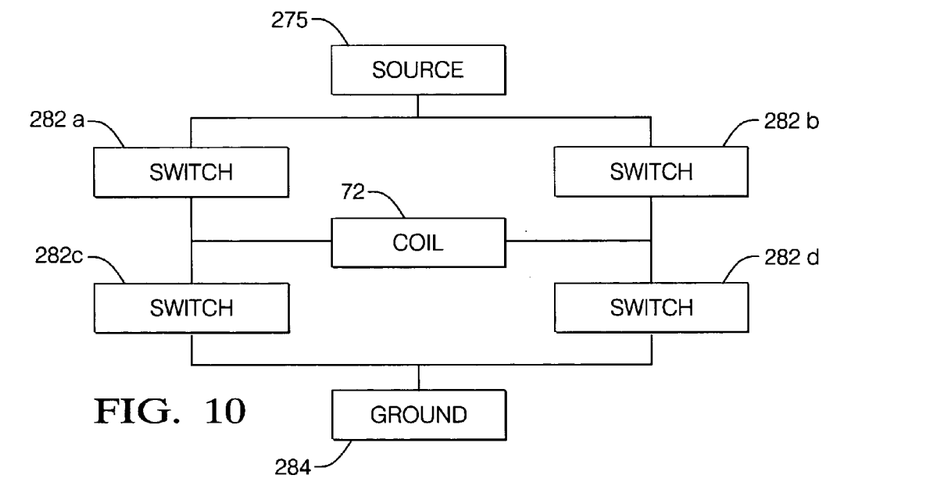
FIG. 10 is a flow chart showing a switch system for the differential assist pressure responsive current control of FIG. 9.

FIG. 9 shows a control for the current through exciting coil 72 as a function of differential pressure. A digital computer 270 is programmed to receive the pressure signal 260 from the differential pressure transducer 162 (or pressure transducer 164 as will be described with respect to FIG. 12) and output a PWM signal derived therefrom to a switch 280 which controls current from an electric power source 275 (e.g. 12 Volts source) through exciting coil 72 of power steering gear 10. Computer 270 may be a standard digital computer based on a microprocessor with I/O apparatus, ROM, RAM and other typical computer components. Computer 270 can additionally receive a signal from the position sensor 8 for determining the switching operation. Switch 280 is preferably a semiconductor switch such as a field effect transistor ("FET") capable of pulse width modulation ("PWM") switching operation. Electric power source 275 may be a standard vehicle DC electrical system. Although the switch 280 is simply shown in FIG. 9, the switch 280 can be an H bridge capable of switching both magnitude and direction of current. Turning to FIG. 10, the switch 280 is shown to include switches 282a, 282b, 282c, and 282d. For a positive current, the switches 282b and 282c are turned off. Switch 280a is used to modulate the current. For a negative current, switches 280a and 280d are turned off, and switch 280b is used to modulate current.

Figure 11:
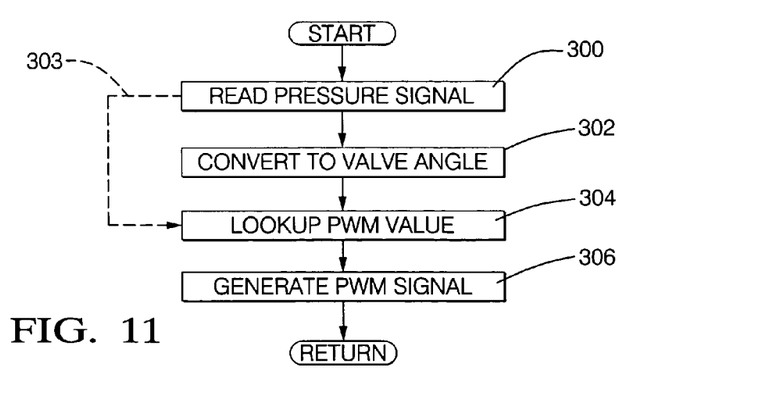

FIG. 11 provides a flow chart illustrating the operation of a program followed by computer 270 in controlling the current through exciting coil 72 in response to the differential pressure of steering gear 10. The program starts by reading the pressure signal 260 from the differential pressure transducer 162 in step 300. As shown in step 302, the pressure signal 260 is used by the computer 270 to derive a valve angle. As shown in step 304, the valve angle is used to enter a lookup table and read a corresponding electric current value that is part of a stored angle/current function. It should be understood that a position signal from position sensor 8 can also be used, in combination with the pressure signal 260, to derive an appropriate current function to overcome vehicle leads and pulls conditions. The electric current value can be in the form of a number representing a duty cycle calculated to produce an average desired current through exciting coil 72. Alternatively, instead of deriving a valve angle from the pressure signal as is done in step 302, step 302 may be skipped, as shown by dotted line 303, and the pressure signal 260 read in step 300, in combination with position signal, can be used to look up PWM value in step 304. It should be understood, however, that the available torque that the actuator can produce is not constant for valve angle, as exemplified in FIG. 7. The current supplied is the desired torque divided by the available torque times the full scale current (e.g. 3 Amps). Since most applications use different pressure angle curves, the available torque using pressure would be different for each application. Using pressure would also require a 3-D look up table when compensating for speed. Thus, including step 302 may result in a simpler overall process than excluding step 302, since using valve angle, the lookup table can simply be the torsional stiffness as a function of speed, and the desired torque would then be calculated based on valve angle. Nonetheless, in the embodiment where the process follows path 303, the program uses the pressure signal to enter a lookup table in step 304 and read a corresponding electric current value that is part of a stored differential pressure/current function. The electric current value is preferably in the form of a number representing a duty cycle calculated to produce an average desired current through exciting coil 72. Finally, the program generates a PWM signal from the electric current value in step 306. The PWM signal is output in a normal manner to control the operation of switch 280 in PWM operation to achieve the desired current level in exciting coil 72. If desired, the program may also read a vehicle speed signal available from the vehicle engine control or a separate sensor and use this signal as an additional input parameter in the table lookup of step 304.

Figure 12:
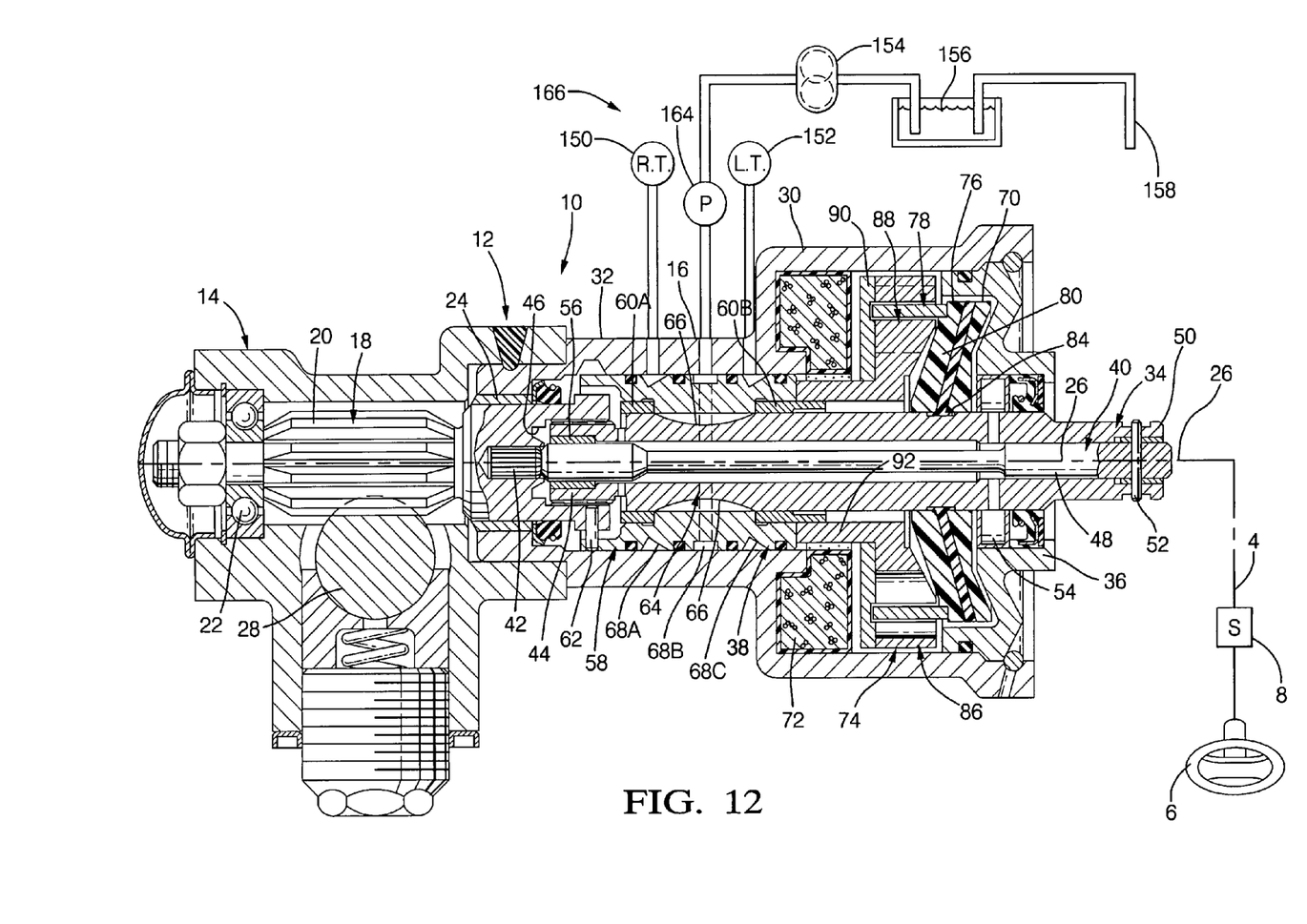

Turning to FIG. 12, in applications in which a steering wheel position sensor 8 is available, it is possible to use a pressure transducer system 166 having a single pressure transducer 164 which measures the supply pressure in groove 68B. While the pressure transducer 164 is illustrated on the supply line for clarity, it should be understood that the pressure transducer 164 may be arranged to measure supply pressure directly within the groove 68B. In this method, the minimum system backpressure (used as the "reference port") is monitored, and subtracted from the pressure reading within the groove 68B. The net pressure is then multiplied by the sign of the steering wheel angle when the vehicle is moving, or by the sign of the steering wheel velocity when the vehicle is stationary. For example: If the minimum pressure is 100 psi, and the pressure transducer reads 130 psi, then the differential pressure would be 130-100, or 30 psi for positive steering wheel angles, and −30 psi for negative steering wheel angles. Steering wheel velocity needs to be used to determine the sign when the vehicle is moving very slow, or is not moving, because pressure can be built in both directions when the steering wheel is either side of center, which is different than when the vehicle is moving at high speeds.

Thus, a system has been described that, when combined with a steering wheel position sensor, both driver input and steering output (pressure) can be monitored. An electrical current can be provided to the actuator to produce a torque which will maintain a pressure required to overcome a vehicle lead, or to reduce the pressure created by a gear imbalance. The pull force can be determined by monitoring differential pressure measured by the differential pressure transducer, and a differential pressure signal is used by the controller (computer 270) to send current to the actuator within the steering system for reducing the pull force. Knowing both input and output also allows for additional advanced capabilities such as stability control, etc. This provides advantages over the prior system that utilized only valve angle sensors, which can only measure how much torque is being put into the system via deflection of the torsion bar. By measuring output pressure, the embodiments disclosed herein not only deduce valve angle, but can also determine how much output force is being generated, and such information is usable for compensating for leads and pulls conditions in a vehicle. Additionally utilizing an input, such as a signal from position sensor 8, can help indicate what kind of lead/pull is being experienced, which in turn assists in determining the appropriate current to supply to the controller for leads and pulls compensation.

While the embodiments have been described with reference to exemplary embodiments, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the embodiments not be limited to the particular embodiment disclosed as the best mode contemplated for carrying out these embodiments, but that the embodiments will include all embodiments falling within the scope of the appended claims. Moreover, the use of the terms first, second, etc. do not denote any order or importance, but rather the terms first, second, etc. are used to distinguish one element from another.

The invention claimed is:

1. A power assist steering system including a valve housing and a proportional control valve supported within the valve housing, the power assist steering system further comprising:
a pressure transducer arranged with respect to the proportional control valve for determining an amount of actuation of the proportional control valve wherein the proportional control valve includes a tubular valve body, a first groove and a second groove between the valve housing and the valve body, wherein the pressure transducer measures a pressure difference between the first groove and the second groove.

2. The power assist steering system of claim 1 wherein the first groove and the second groove are formed within the tubular valve body.

3. The power assist steering system of claim 1 wherein the proportional control valve further comprises a valve spool within the valve body, wherein the valve spool is rotatable relative to the valve body, and wherein a power assist steering force is produced in relation to relative rotation between the valve spool and the valve body.

4. The power assist steering system of claim 3 further comprising a plurality of throttling orifices defined between the tubular valve body and the valve spool, and passages within the tubular valve body for permitting fluid communication between the throttling orifices and the first and second grooves, wherein, upon rotation of the valve spool within the tubular valve body, half of the throttling orifices become smaller and regulate a steering assist boost pressure in one of the first groove and the second groove.

5. The power assist steering system of claim 4 further comprising a hydraulic pump for supplying fluid to a third groove positioned between the tubular valve body and the valve housing, wherein the third groove is in fluid communication with the throttling orifices.

6. The power assist steering system of claim 1 further comprising:
a first chamber in fluid communication with the first groove; and,
a second chamber in fluid communication with the second groove;
wherein the pressure transducer compares pressure within the first chamber to pressure within the second chamber to determine differential pressure.

7. The power assist steering system 1 wherein the pressure transducer converts the pressure difference into an electrical signal for use by a controller that determines an amount of current to be sent to an exciting coil of the power assist steering system.

8. The power assist steering system of claim 7 wherein the controller converts the electrical signal into a valve angle measurement.

9. The power assist steering system of claim 7 further comprising a position sensor sensing position of a hand wheel, wherein a position signal from the position sensor is used in combination with the pressure difference for determining an amount of current to be sent to the exciting coil.

10. The power assist steering system of claim 1 wherein a pressure measurement from the pressure transducer provides information regarding steering output, wherein the information regarding steering output is used to determine an amount of pull force experienced by the power assist steering system.

11. The power assist steering system of claim 10 further comprising a position sensor sensing position of a hand wheel, wherein a position signal from the position sensor is used in combination with the pressure difference for determining the amount of pull force experienced by the power assist steering system.

12. The power assist steering system of claim 1 further comprising a controller and an actuator, wherein pull force is determined by monitoring pressure measured by the pressure transducer, and wherein a pressure signal is used by a controller to send current to an actuator within the steering system for reducing the pull force.

13. The power assist steering system of claim 1 wherein the proportional control valve is connected between a driver manipulated steering shaft and a steering gear.

14. The power assist steering system of claim 1 wherein the proportional control valve includes a tubular valve body, a supply chamber provided between the valve housing and the valve body for supplying fluid from a hydraulic pump to grooves positioned between the valve housing and the valve body, wherein the pressure transducer measures a supply pressure reading within the supply chamber.

15. The power assist steering system of claim 14 wherein minimum system backpressure of the power assist steering system is subtracted from the supply pressure reading.

16. A method of determining an amount of current to supply to an electromagnetic apparatus in a power assist steering system for providing leads and pulls compensation to a vehicle, the power assist steering system further including a valve housing and a proportional control valve supported within the valve housing, the method comprising:
measuring pressure within the proportional control valve;
sending a signal regarding the pressure to a control within the power assist steering system; and,
utilizing the signal regarding the pressure within the control for determining an amount of current to supply to the electromagnetic apparatus necessary to compensate for leads and pulls experienced by the power assist steering system.

17. The method of claim 16 further comprising employing a differential pressure transducer for measuring differential pressure between a first groove and a second groove between the proportional control valve and the valve housing.

18. The method of claim 16 further comprising employing a pressure transducer for measuring the pressure within a supply chamber between the proportional control valve and the valve housing.

19. The method of claim 16 further comprising converting the signal into a valve angle measurement.

20. The method of claim 16 further comprising sensing hand wheel position and utilizing a position signal in combination with the signal regarding the pressure within the control for determining the amount of current to supply to the electromagnetic apparatus.

* * * * *